(12) United States Patent
Bankovic

(10) Patent No.: US 8,235,771 B2
(45) Date of Patent: Aug. 7, 2012

(54) METHOD AND APPARATUS FOR HONING A WORKPIECE AND A WORKPIECE

(75) Inventor: Daniel R. Bankovic, St. Marys, PA (US)

(73) Assignee: Metaldyne LLC, Plymouth, MI (US)

( * ) Notice: Subject to any disclaimer, the term of this patent is extended or adjusted under 35 U.S.C. 154(b) by 321 days.

(21) Appl. No.: 12/542,489

(22) Filed: Aug. 17, 2009

(65) Prior Publication Data

US 2010/0041320 A1    Feb. 18, 2010

Related U.S. Application Data

(60) Provisional application No. 61/089,234, filed on Aug. 15, 2008, provisional application No. 61/089,507, filed on Aug. 16, 2008.

(51) Int. Cl.
*B24B 1/00* (2006.01)

(52) U.S. Cl. ............... 451/47; 451/164; 451/180; 409/9

(58) Field of Classification Search .................... 451/47, 451/164, 180
See application file for complete search history.

(56) References Cited

U.S. PATENT DOCUMENTS

| 1,537,626 | A | * | 5/1925 | Sponable ..................... 451/180 |
| 1,683,867 | A | * | 9/1928 | Copland et al. ................. 451/47 |
| 1,698,214 | A | * | 1/1929 | Copland et al. ............... 451/547 |
| 1,698,215 | A | * | 1/1929 | Copland et al. ................. 451/47 |
| 2,162,187 | A | * | 6/1939 | Tharp ......................... 451/441 |
| 2,344,036 | A | * | 3/1944 | Franck ........................ 451/540 |
| 2,422,418 | A | * | 6/1947 | Hutto ........................... 451/46 |
| 3,296,747 | A | * | 1/1967 | Philippsen et al. ............. 451/51 |
| 4,065,881 | A |   | 1/1978 | Gillette |
| 4,449,328 | A |   | 5/1984 | Gillette et al. |
| 4,991,361 | A |   | 2/1991 | Huppert et al. |
| 5,341,603 | A | * | 8/1994 | Pollock et al. ................ 451/180 |
| 5,775,978 | A | * | 7/1998 | Brocksieper et al. ........... 451/51 |
| 6,074,282 | A | * | 6/2000 | Schimweg ..................... 451/49 |

FOREIGN PATENT DOCUMENTS

| EP | 0432908 A2 |   | 6/1991 |
| GB | 2018178 A | * | 10/1979 |

OTHER PUBLICATIONS

International Search Report for PCT/US2009/054059 dated Apr. 5, 2010.
Written Opinion of the International Searching Authority for PCT/US2009/054059 dated Apr. 5, 2010.

* cited by examiner

*Primary Examiner* — Maurina Rachuba
(74) *Attorney, Agent, or Firm* — Cantor Colburn LLP

(57) ABSTRACT

A method for honing a workpiece by passing a workpiece through a hone tool having a plurality of abrasive surfaces configured to remove a portion of all exterior machining surfaces of the workpiece as it is passed through the hone tool, the exterior machining surfaces being non-uniform and wherein the hone tool is configured to hone all of the exterior machining surfaces simultaneously as workpiece is passed through the hone tool. An assembly for honing a workpiece, the assembly having a plurality of hone tools each having abrasive surfaces configured to remove a portion of exterior non-uniform surfaces of a workpiece pushed through the hone tool, wherein the hone tool is configured to surround the entire periphery of the workpiece being passed therethrough.

20 Claims, 2 Drawing Sheets

METHOD AND APPARATUS FOR HONING A WORKPIECE AND A WORKPIECE

CROSS REFERENCE TO RELATED APPLICATIONS

This application claims the benefit of the following U.S. Provisional Applications Ser. No. 61/089,507 filed Aug. 16, 2008 and Ser. No. 61/089,234 filed Aug. 15, 2008 the contents each of which are incorporated herein by reference thereto.

BACKGROUND

Exemplary embodiments of the present invention relate to honing processes, in particular a work piece formed by a honing process.

Gear tooth profiles and other work piece tooth profiles are typically finished using hobbing, shaping, or grinding processes. All of which are capital intensive. The highest precision gears are ground which is very expensive.

Accordingly, it is desirable to provide high precision work pieces or gear without associated costs.

SUMMARY OF THE INVENTION

In accordance with an exemplary embodiment of the invention, a method for honing a workpiece is provided by passing a workpiece through a hone tool having a plurality of abrasive surfaces configured to remove a portion of all exterior machining surfaces of the workpiece as it is passed through the hone tool, the exterior machining surfaces being non-uniform and wherein the hone tool is configured to hone all of the exterior machining surfaces simultaneously as the workpiece is passed through the hone tool.

In another exemplary embodiment, an assembly for honing a workpiece is provided, the assembly having a plurality of hone tools each having abrasive surfaces configured to remove a portion of exterior non-uniform surfaces of a work piece pushed through the hone tool, wherein the hone tool is configured to surround the entire periphery of the workpiece being passed therethrough.

In still another exemplary embodiment, a method for honing a workpiece is provided, the method having the steps of stacking a plurality of workpieces on a first assembly; providing a force in a first direction to the plurality of workpieces by the first assembly to pass the plurality of workpieces through a plurality of hone tools each being free moving with respect to each other in a rotational direction about an axis parallel to the first direction and each of the plurality of hone tools has a plurality of abrasive surfaces disposed in an opening, wherein each opening of the plurality of hone tools is smaller in size with respect to an opening of an adjacent hone tool and the plurality of abrasive surfaces in each opening are configured to remove a portion of all exterior surfaces of the plurality of workpieces as they are passed through the plurality of hone tools, wherein each of the exterior surfaces of the plurality of workpieces are non-uniform and each of the plurality of hone tools are configured to simultaneously hone all of the exterior features of each of the plurality of workpieces being passed through the plurality of hone tools.

Additional features and advantages of the various aspects of exemplary embodiments of the present invention will become more readily apparent from the following detailed description in conjunction with the drawings wherein like reference numerals refer to corresponding parts in the several views.

Although the drawings represent varied embodiments and features of the present invention, the drawings are not necessarily to scale and certain features may be exaggerated in order to illustrate and explain exemplary embodiments of the present invention. The exemplification set forth herein illustrates several aspects of the invention, in one form, and such exemplification is not to be construed as limiting the scope of the invention in any manner.

DETAILED DESCRIPTION OF EXEMPLARY EMBODIMENTS

As discussed above, gear tooth profiles are typically finished using hobbing, shaping, or grinding processes. All of which are capital intensive. The highest precision gears are ground which is very expensive. Accordingly, exemplary embodiments of the present invention are intended to enable a gear shaved or even ground gear tolerances at substantially lower capital and process cost.

Figure 1:
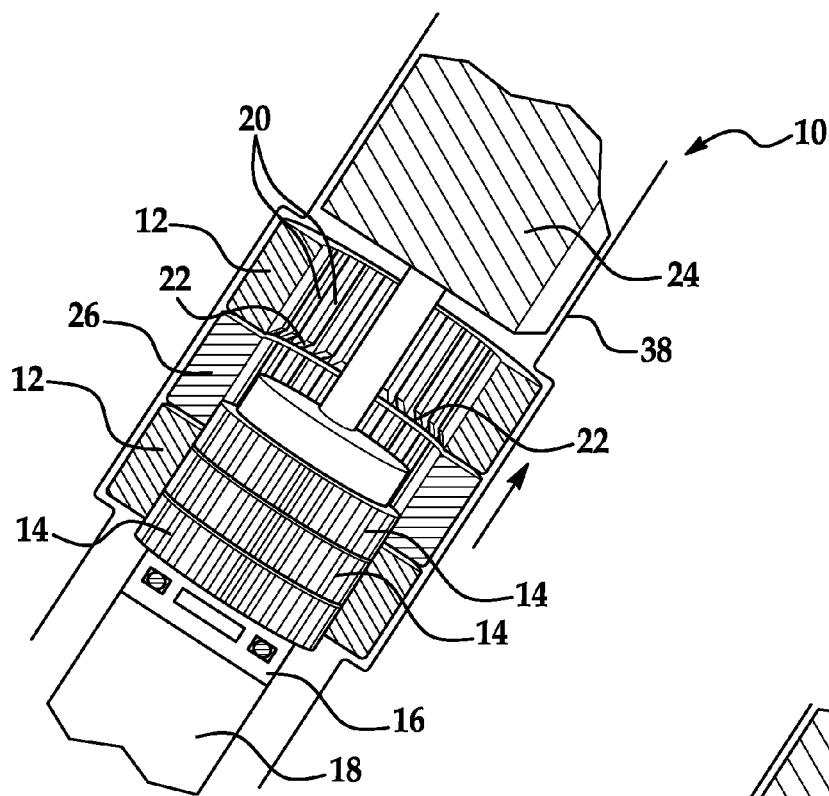
FIG. 1 is a perspective cross-sectional view of an exemplary embodiment of the present invention.

Exemplary embodiments of the present invention relate to a method, apparatus and workpiece or gear formed by honing process. Referring now to FIG. 1 an assembly 10 comprising at least one or plurality of coated hone tools 12 each having an inner opening with a plurality of abrasive coated surfaces for honing an outside surface or diameter of the workpiece being passed through the assembly. Each hone tool is configured to remove a portion of all of the exterior surfaces of the workpiece simultaneously as it is passed through the hone tool. In one embodiment, each of the work pieces have non-uniform exterior surfaces such as those of a gear, or other components such as vane pump components, VVT components, gerotors, pulleys, sprockets, etc., and the hone tool is configured to remove a portion of all the exterior non-uniform surfaces of the work piece simultaneously as it is passed through the hone tool. In one non-limiting exemplary embodiment, the hone tool is configured to surround the entire periphery of the workpiece being passed therethrough. It being understood that when a plurality of hone tools are used each subsequent hone tool has an inner dimension smaller than the previous hone tool such that each successive hone tool removes portions of an exterior surface of the workpiece being passed through the hone tools.

In one embodiment, a plurality of work pieces 14 may be stacked upon a bearing assembly 16 rotatably secured to a lower cylinder 18, the lower cylinder delivers the energy to pulse/work the workpiece through the hone tools. The lower cylinder or lower actuator assembly 18 provides a platform on which the workpiece is placed (e.g., though bearing assembly 16 or alternatively on a surface of the assembly 18). Using a pulse motion, the lower actuator assembly pushes, or works, the workpiece through the hone tool(s), thereby imparting the dimensions of the hone tool inner diameter ID to the workpiece. The bearing assembly 16 allows the workpieces to rotate with respect to the lower cylinder wherein rotation of the workpieces as they are being pushed through the hone tools is desired for example, a gear having helical gear teeth. Although a plurality of workpieces are illustrated it is understood that exemplary embodiments of the present invention may be directed to a single workpiece or numerous workpieces similarly a plurality of hone tools are illustrated however it is contemplated that a single hone tool can be utilized or a plurality of hone tools could be utilized.

Each hone tool is configured to have a plurality of abrasive surfaces 20 that have a larger inner dimension at the receiving end and a smaller dimension at the exit and such that as a workpiece is passed through the abrasive surfaces of the hone tool and exterior dimension of the workpiece is produced or honed. In addition and in one exemplary embodiment, each of the plurality of abrasive surfaces of the hone tools hone tools has a chamfered surface 22. The chamfered surface 22 allows the hone tools to be free-floating with respect to each other. In addition, an upper ram assembly 24 (e.g., air cylinder, hydraulic cylinder, spring pressure, etc.) applies a downward pressure (e.g., counterforce) to the workpiece(s) as they are passed through the hone tools in accordance with the honing process. The counterforce being less than the force pushing the workpieces through the assembly. This prevents misalignment and facilitates lubrication.

The Figures show a plurality of finished abrasive coated hone tools 12. The hone tools are 'free-floating' with respect to one another. Although three are shown in FIG. 1, the number of successive hone tools will vary, depending on stock removal, requirements, and part configuration.

Figure 2:
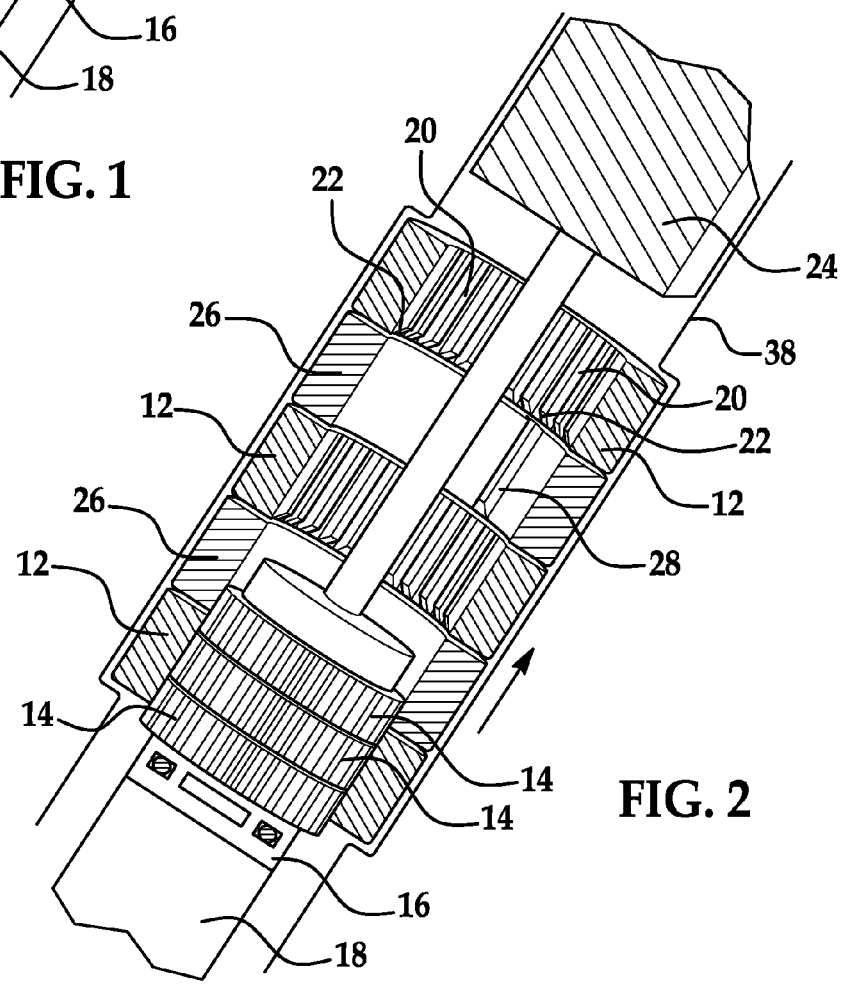
FIG. 2 is a perspective cross-sectional view of an alternative exemplary embodiment of the present invention.

Referring now to FIG. 2 an alternative assembly is illustrated here a plurality of spacers 26 are provided between each of the hone tools. Spacers enable the processing of multiple sized workpieces (e.g., gears or any other workpiece requiring honing for example non-cylindrical workpieces each having non-uniform exterior surfaces). In one embodiment, each of the spacers will have geometric features 28 so that radial orientation is maintained between the hone tools. In one embodiment, the features 28 will match the configuration of the abrasive surfaces so that the workpieces or gears being honed are aligned for each successive honing tool by engaging the same feature or portion of the workpiece being engaged by the abrasive surfaces of the hone tool.

Figure 3:
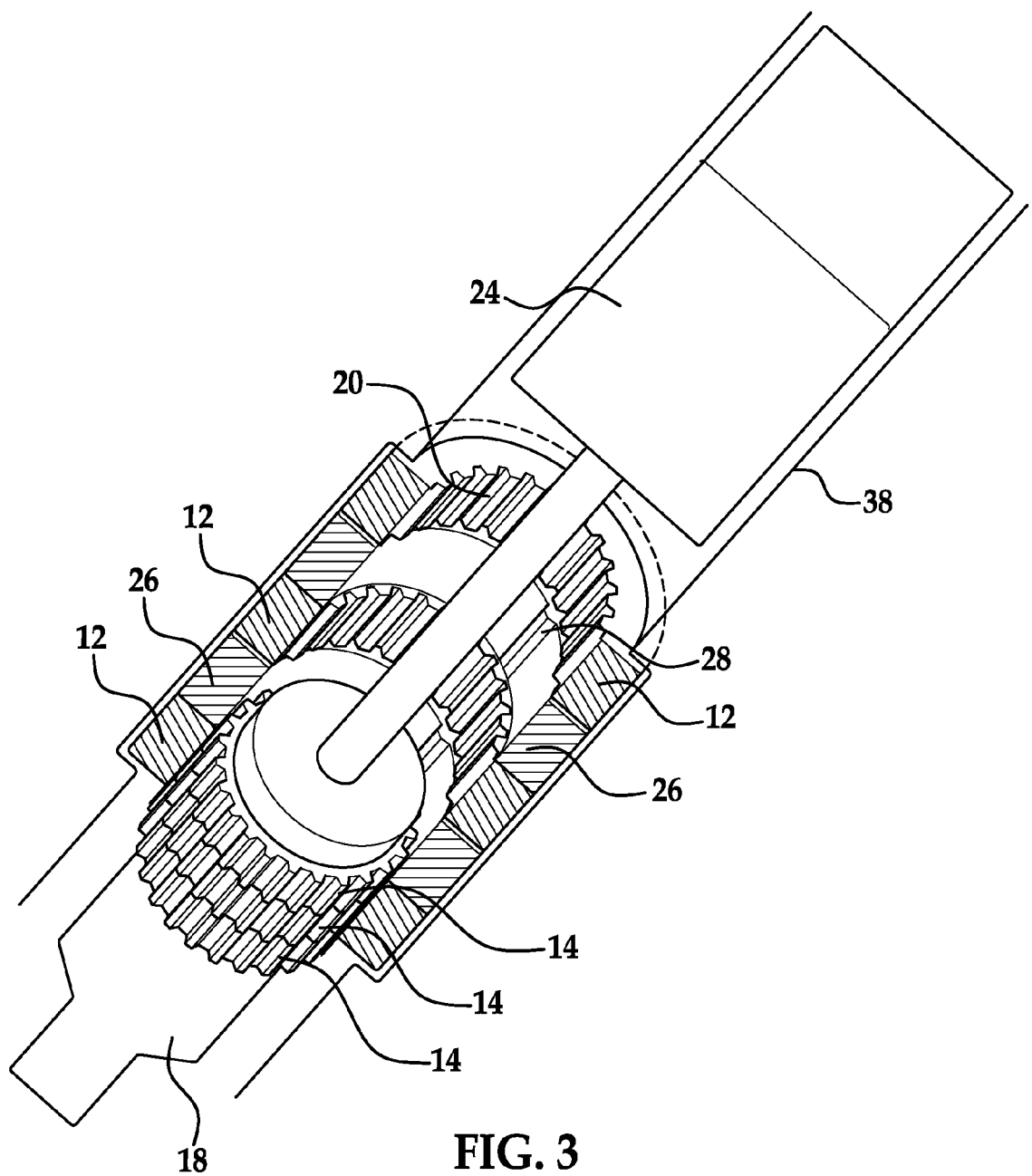
FIG. 3 is another perspective cross-sectional view of an alternative exemplary embodiment of the present invention.

The spacer(s) enable the hone tools to be free floating with respect to each other since each spacer will be thicker than each individual workpiece such that a single workpiece will not bind two adjacent hone tools. Moreover, the spacers also allow the processing of multiple gears (as shown) in FIGS. 2 and 3, however in the case of a single gear honing process, the spacer may be omitted, so long as the hone tools are not bound by a workpiece traversing a pair of adjacent hone. The spacer thickness is greater than t (the thickness of the workpiece). As shown in FIGS. 2 and 3 a plurality of abrasive coated hone tools and spacers are illustrated. In accordance with an exemplary embodiment of the present invention, the workpiece is worked through the hone tools. The hone tools are progressively smaller in order to maintain equal and sufficiently small stock removal through the process. In order to simplify the manufacture of the hone tool and the setup of the hone process in a machine, it is best if they are 'free-floating' with respect to one another.

FIG. 3 is another view illustrating an exemplary embodiment of the present invention.

In one embodiment, the assembly is also received within a sleeve 38 disposed about the outer periphery of the hone tools and the spacers, wherein sleeve 38 allows the spacers and hone tools to be free floating and rotate with respect to each other. Sleeve 38 or some other equivalent component will maintain the position of the hone tools and spacers such that the workpieces are passed through in the direction of the force being provided by the lower cylinder or lower actuator assembly 18.

By allowing machining (honing) stock only on the flanks of the teeth of the gears, the finishing equipment is greatly simplified, and machine time required to arrive at the final gear tolerances is greatly reduced. In the case of cut-gears (as from cast or forged, steel, aluminum, brass, etc.), the grinding operation is replaced with a more economical honing operation. In the case of powder metal gears, hobbing, shaving, and grinding may be eliminated; ideally, the only material removal operation performed on the gear teeth is the honing operation.

The highest precision gears are hobbed or shaved to semi-net shape, heat treated, and then finish ground to achieve the final tooth geometry. In this case, the final finishing process is honing of the tooth flanks instead of grinding. In the case of a powder metal gear, a semi-net-shape gear is die pressed and sintered. The tooth profile (flank) may have a small amount of stock on it for finishing. The root diameter and outside diameter do not have finishing stock. The powdered metal gear is then placed in a special honing machine on a stage. Powdered metal gear blanks for this process may be in the as-sintered state, but there are a number of semi-finished processing steps that could optionally be included such as: sizing, coining, shot peening, tooth surface densifying and equivalents thereof Exemplary embodiments of the present invention can be used with workpieces formed by other non-limiting net-shape gear-forming processes such as cast, forged, and extruded gear forms or any other gear forming process.

In the case of a helical gear, the stage includes a rotating bearing 16. An abrasive coated honing tool (or tools) is aligned with the gear so that the gear can be pushed or worked through the honing tool(s) in a continuous or pulsed-load fashion. A counterforce is applied from the opposite end to keep the workpiece flat on the stage. Pulse loading facilitates lubrication and provides the working action. Multiple hone tools are used to limit the amount of stock removed in each tool. In other words each hone tool removes only a portion of the workpiece. The hone tools are free-floating with respect to one another, and they are separated by a spacer that is thicker than the workpiece. Alternatively, the honing tool may be worked over a stationary workpiece, which in one non-limiting embodiment is a gear. Whether the rotating bearing is associated with the gear or the honing tool is immaterial to the intent of the patent. This process is applicable to straight gears and helical gears up to 45° helix angle of course, angles greater or less than 45° are also contemplated to be within the scope of the present invention.

The process of exemplary embodiments of the present invention enables honing on non-round outside dimensions of a component. This is particularly useful for processing of a wide variety of components (e.g., gears, sprockets, gerotors, vane pump components, and variable valve timing (VVT)).

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A method for honing a workpiece, comprising:
passing a workpiece through a hone tool having a plurality of abrasive surfaces configured to remove a portion of all exterior machining surfaces of the workpiece as it is passed through the hone tool, the exterior machining surfaces being non-uniform and wherein the hone tool is configured to hone all of the exterior machining surfaces simultaneously as the workpiece is passed through the hone tool.

2. The method as in claim 1, wherein a first cylinder provides a force in a first direction to pass the workpiece through the hone tool.

3. The method as in claim 2, further comprising:
applying a force to the workpiece in a direction opposite to the first direction to prevent misalignment of the workpiece with respect to the hone tool, the force in the first direction being greater than the force in the direction opposite to the first direction.

4. A method for honing a workpiece, comprising:
stacking a plurality of workpieces on a first assembly;
providing a force in a first direction to the plurality of workpieces by the first assembly to pass the plurality of workpieces through a plurality of hone tools each being free moving with respect to each other in a rotational direction about an axis parallel to the first direction and each of the plurality of hone tools has a plurality of abrasive surfaces disposed in an opening, wherein each opening of the plurality of hone tools is smaller in size with respect to an opening of an adjacent hone tool and the plurality of abrasive surfaces in each opening are configured to remove a portion of all exterior surfaces of the plurality of workpieces as they are passed through the plurality of hone tools, wherein each of the exterior surface of the plurality of workpieces are non-uniform in configuration and each of the plurality of hone tools are configured to simultaneously hone all of the exterior features of each of the plurality of workpieces being passed through the hone tools.

5. The method as in claim 4, further comprising:
applying a force to the plurality of workpieces in a direction opposite to the first direction to prevent misalignment of the plurality of workpieces with respect to the plurality of hone tools, the force in the first direction being greater than the force in the direction opposite to the first direction.

6. The method as in claim 5, further comprising:
locating a spacer between each of the plurality of hone tools.

7. The method as in claim 6, wherein each spacer has a thickness greater than a thickness of each workpiece.

8. The method as in claim 7, wherein each spacer has a feature configured to maintain a radial orientation between each of the plurality of hone tools by engaging at least one exterior feature of each of the plurality of workpieces being passed through each of the plurality of hone tools and each of the plurality of abrasive surfaces is chamfered at the opening of each hone tool.

9. The method as in claim 6, wherein each spacer has a feature configured to maintain a radial orientation between each of the plurality of hone tools by engaging at least one exterior feature of each of the plurality of workpieces.

10. The method as in claim 9, wherein each workpiece is a gear.

11. The method as in claim 4, further comprising:
rotationally supporting the workpieces on the first assembly with a bearing assembly.

12. The method as in claim 4, further comprising:
surrounding each of the plurality of hone tools with a sleeve.

13. The method as in claim 12, further comprising:
applying a force to the plurality of workpieces in a direction opposite to the first direction to prevent misalignment of the plurality of workpieces with respect to the plurality of hone tools, the force in the first direction being greater than the force in the direction opposite to the first direction; and
locating a spacer between each of the plurality of hone tools.

14. The method as in claim 13, wherein each spacer has a thickness greater than a thickness of each workpiece and wherein each spacer has a feature to maintain a radial orientation between each of the plurality of hone tools and each of the workpieces being passed through each of the plurality of hone tools and each of the plurality of abrasive surfaces is chamfered at the opening of each hone tool and wherein each hone tool is configured to surround the entire periphery of the workpiece being passed through the hone tool.

15. An assembly for honing a workpiece, comprising:
a plurality of hone tools each having abrasive surfaces configured to remove a portion of exterior non-uniform surfaces of a workpiece pushed through an opening in each of the plurality of hone tools, wherein each hone tool is configured to surround and simultaneously hone the entire periphery of the workpiece being passed therethrough.

16. The assembly as in claim 15, wherein a spacer is disposed between each of the plurality of hone tools.

17. The assembly as in claim 16, wherein the opening in each of the plurality of hone tools is smaller in size with respect to an opening in an adjacent hone tool and the abrasive surfaces proximate to each opening are configured to remove a portion of exterior non-uniform surfaces of the workpiece as it passed through the plurality of hone tools.

18. The assembly as in claim 17, wherein the abrasive surfaces of each of the plurality of hone tools is chamfered at the opening and each spacer further comprises a geometric feature for aligning the workpiece with each of the plurality of hone tools.

19. The assembly as in claim 16, wherein the workpiece is rotationally supported on a first actuator assembly for providing a force in a first direction to push the workpiece through the plurality of hone tools and the assembly further comprises a second actuator assembly for providing a force to the workpiece in a direction opposite to the first direction, the force in the first direction being greater than the force in the direction opposite to the first direction.

20. The assembly as in claim 19, wherein the plurality of hone tools are surrounded by a sleeve.

* * * * *